(12) United States Patent
Xu et al.

(10) Patent No.: US 11,736,382 B2
(45) Date of Patent: *Aug. 22, 2023

(54) METHOD AND SYSTEM FOR OBTAINING FORWARDING INFORMATION BASE OF DEVICE ON NETWORK, AND DEVICE

(71) Applicant: Huawei Technologies Co., Ltd., Shenzhen (CN)

(72) Inventors: Weiping Xu, Dongguan (CN); Yuanlong Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,340

(22) Filed: May 13, 2022

(65) Prior Publication Data

US 2022/0278918 A1 Sep. 1, 2022

Related U.S. Application Data

(63) Continuation of application No. 17/135,460, which is a continuation of application No.
(Continued)

(30) Foreign Application Priority Data

Jun. 29, 2018 (CN) .......................... 201810700361.5

(51) Int. Cl.
*H04L 45/02* (2022.01)
*H04L 41/0668* (2022.01)
*H04L 45/00* (2022.01)

(52) U.S. Cl.
CPC .......... *H04L 45/02* (2013.01); *H04L 41/0668* (2013.01); *H04L 45/54* (2013.01); *H04L 45/56* (2013.01)

(58) Field of Classification Search
None
See application file for complete search history.

(56) References Cited

U.S. PATENT DOCUMENTS 6,922,118 B2 7/2005 Kubena et al.
2008/0259784 A1 10/2008 Allan et al.
(Continued)

FOREIGN PATENT DOCUMENTS

CN 102904804 A 1/2013
CN 103475507 A 12/2013
(Continued)

OTHER PUBLICATIONS

Zeng, J.H. et al., "Libra: Divide and Conquer to Verify Forwarding Tables in Huge Networks", Google, ONRC Research, NSDI, Apr. 2, 2014, 28 pages.

*Primary Examiner* — Anh Ngoc M Nguyen
(74) *Attorney, Agent, or Firm* — Slater Matsil, LLP

(57) ABSTRACT

This application provides a method for obtaining a FIB of a device on a network. The network includes a verification system and a plurality of devices, and a first device is one of the plurality of devices. The first device receives a request message sent by the verification system, where the request message carries a command for obtaining a FIB of the first device that is generated at a specified time. The first device obtains the FIB or a FIB snapshot of the first device that is generated at the specified time. The first device adds the obtained FIB or FIB snapshot to a response message, and sends the response message to the verification system.

20 Claims, 6 Drawing Sheets

Related U.S. Application Data

PCT/CN2019/093494, filed on Jun. 28, 2019, now Pat. No. 11,343,167.

(56) References Cited

U.S. PATENT DOCUMENTS

| | | |
|---|---|---|
| 2011/0268130 A1 | 11/2011 | Tsier et al. |
| 2014/0169368 A1 | 6/2014 | Grover et al. |
| 2014/0181226 A1* | 6/2014 | Xu ........................ H04L 51/214 |
| | | 709/206 |
| 2014/0286339 A1* | 9/2014 | Vovnoboy ............. H04L 45/566 |
| | | 370/392 |
| 2016/0142281 A1* | 5/2016 | Yao ..................... G06F 16/9027 |
| | | 370/254 |
| 2017/0339054 A1 | 11/2017 | Yadav et al. |
| 2018/0069791 A1 | 3/2018 | Dong |

FOREIGN PATENT DOCUMENTS

| | | |
|---|---|---|
| CN | 103516717 A | 1/2014 |
| CN | 104158742 A | 11/2014 |
| CN | 105939402 A | 9/2016 |
| CN | 107171883 A | 9/2017 |
| CN | 107241236 A | 10/2017 |
| WO | 2017105431 A1 | 6/2017 |

* cited by examiner

METHOD AND SYSTEM FOR OBTAINING FORWARDING INFORMATION BASE OF DEVICE ON NETWORK, AND DEVICE

CROSS-REFERENCE TO RELATED APPLICATIONS

This application is a continuation of U.S. patent application Ser. No. 17/135,460, filed on Dec. 28, 2020, which is a continuation of International Application No. PCT/CN2019/093494, filed on Jun. 28, 2019, which claims priority to Chinese Patent Application No. 201810700361.5, filed on Jun. 29, 2018. All of the aforementioned patent applications are hereby incorporated by reference in their entireties.

TECHNICAL FIELD

The present application relates to the field of communications technologies, and in particular, to a method and a system for obtaining a forwarding information base (FIB) of a device, and a device.

BACKGROUND

With an increase of network devices and network protocols, a network environment becomes increasingly complex, and network complexity makes it harder to carry out network maintenance and troubleshooting. For example, disadvantages of software design of a device on a network are increasing gradually. For example, invalid parameters, function errors, and hardware failures inside a device, or faulty operations, forwarding loops, reachability problems, performance degradation outside a device may cause the network to run abnormally due to failures. To resolve these problems, people develop some tools for dealing with the foregoing problems, such as the simple network management protocol (SNMP) and the network flow routine (NETFLOW). However, with an increasing network scale, these tools gradually become inefficient. Therefore, the industry researches some network verification technologies. The verification technology usually uses a forwarding behavior of a network device and a data structure or a formula to model the network device or an entire network, to verify whether a failure exists on the device or on a network status, for example, providing interfaces such as the telecommunications network protocol (TELNET), the SNMP, and the network configuration protocol (NETCONF) based on the network device, obtaining forwarding information bases of the device, modeling the network device or the entire network by using a data structure or a formula, and verifying whether a problem such as a loop occurs on the network according to a verification algorithm. However, on a large-scale network, because there is a large quantity of forwarding information bases on the device, it takes a relatively long time to obtain these forwarding information bases. However, the device learns entries quickly. As a result, forwarding entries of the device obtained by a verification system are inconsistent with the entries learned by the device. Therefore, a verification result is inaccurate. This brings great challenges to development of the verification technology.

SUMMARY

This application provides a method and a system for obtaining a FIB of a device on a network, and a device, so that a verification system can accurately and efficiently obtain the FIB of the device, to realize accuracy of a verification result.

According to a first aspect, this application provides a method for obtaining a FIB of a device on a network. The network includes a verification system and a plurality of devices. A first device is used as an example to describe steps performed by the plurality of devices. The first device receives a request message sent by the verification system, where the request message carries a command for obtaining a FIB of the first device that is generated at a specified time. The first device obtains the FIB or a FIB snapshot of the first device that is generated at the specified time. The first device adds the obtained FIB or FIB snapshot to a response message, and sends the response message to the verification system.

According to the foregoing method, the device on the network sends, to the verification system, a FIB or a FIB snapshot that is generated at a specified time, so that the verification system may obtain the FIB or the FIB snapshot that is generated at a same time by the device. This can avoid a phenomenon that the FIB obtained by the verification system is inaccurate because of an excessively long time for collecting the FIB of the device. In this way, accuracy of a result of network verification performed by the verification system at the specified time can be ensured.

With reference to the first aspect, in a first possible implementation, that the first device obtains the FIB of the first device that is generated at the specified time includes: The first device obtains the specified time from the request message; the first device stops, at the specified time, updating the FIB of the first device that is stored in a storage area; and the first device obtains the FIB of the first device from the storage area.

Updating is stopped in the storage area of the first device at the specified time, so that the storage area can store the FIB generated by the first device at the specified time. In this way, the first device obtains the FIB generated at the specified time.

With reference to the first aspect, in a second possible implementation, the first device obtains the specified time from the request message; the first device stops, at the specified time, updating the FIB of the first device that is stored in a storage area; and the first device obtains the FIB snapshot of the first device from the storage area. Alternatively, the first device obtains the specified time from the request message; and the first device obtains the FIB snapshot of the first device that is generated at the specified time.

The first device may obtain, according to the specified time, a FIB snapshot previously stored by the first device, or may generate, according to the specified time, a FIB snapshot at the specified time. Alternatively, the first device may obtain a FIB snapshot that is generated at the specified time and stored in a memory, and obtain, according to the foregoing method, the FIB snapshot of the first device that is generated at the specified time.

With reference to the first aspect, in a third possible implementation, the request message further carries a period for obtaining the FIB or the FIB snapshot of the first device; and the first device provides the FIB or the FIB snapshot of the first device to the verification system according to the period.

The first device sends the FIB of the first device to the verification system according to the period in the request message, so that the first device may actively send the FIB or the FIB snapshot to the verification system according to the period.

With reference to the first aspect, in a fourth possible implementation, the first device adds, to the response message, a time for generating the FIB of the first device.

The first device adds the time for generating the FIB to the response message and sends the response message to the verification system, so that the verification system obtains the time for generating the FIB. In this way, the verification system may classify the obtained FIB according to a time. This facilitates verification and computation.

According to a second aspect, this application provides a method for obtaining a FIB of a device. The method includes: A verification system sends a request message to each of a plurality of devices, where the request message carries a command for obtaining a FIB generated at a specified time by each of the plurality of devices; the verification system receives a response message sent by each of the plurality of devices, where the response message carries the FIB or a FIB snapshot generated at the specified time by each of the plurality of devices; and the verification system obtains the FIB or the FIB snapshot from the response message of each of the plurality of devices, and verifies, based on the FIB or the FIB snapshot, whether a failure occurs on a network at the specified time.

With reference to the second aspect, in a first possible implementation, the request message further carries a period for obtaining the FIB or the FIB snapshot of each of the plurality of devices, and the period indicates each of the plurality of devices to provide the FIB or the FIB snapshot of the device according to the period.

With reference to the second aspect, in a second possible implementation, the response message of each device carries a time at which the device generates the FIB.

According to a third aspect, this application provides a device. The device includes a receiving unit, an obtaining unit, a generation unit, and a sending unit. The receiving unit is configured to receive a request message sent by a verification system, where the request message carries a command for obtaining a FIB generated at a specified time. The obtaining unit is configured to obtain the FIB or a FIB snapshot generated at the specified time. The generation unit is configured to generate a response message, where the response message carries the FIB or the FIB snapshot. The sending unit is configured to send the response message to the verification system.

With reference to the third aspect, in a first possible implementation, the obtaining unit is configured to obtain the specified time from the request message; the generation unit is configured to stop, at the specified time, updating the FIB of the device that is stored in a storage area; and the obtaining unit is configured to obtain the FIB of the device from the storage area.

With reference to the third aspect, in a second possible implementation, the obtaining unit is configured to obtain the specified time from the request message; the generation unit is configured to stop, at the specified time, updating the FIB of the device that is stored in a storage area; and the obtaining unit is configured to obtain the FIB snapshot of the device from the storage area. Alternatively, the obtaining unit is configured to obtain the specified time from the request message; and the obtaining unit is configured to obtain the FIB snapshot of the device that is generated at the specified time.

With reference to the third aspect, in a third possible implementation, the request message further carries a period for obtaining the FIB or the FIB snapshot of the device, and the device provides the FIB or the FIB snapshot of the device to the verification system according to the period.

With reference to the third aspect, in a fourth possible implementation, the device further includes an adding unit. The adding unit is configured to add a time for generating the FIB of the device to the response message.

According to a fourth aspect, this application provides a verification device. The verification device includes a sending unit, a receiving unit, an obtaining unit, and a verification unit. The sending unit is configured to send a request message to each of a plurality of devices, where the request message carries a command for obtaining a forwarding information base FIB generated at a specified time by each of the plurality of devices. The receiving unit is configured to receive a response message sent by each of the plurality of devices, where the response message carries the FIB or a FIB snapshot generated at the specified time by each of the plurality of devices. The obtaining unit is configured to obtain the FIB or the FIB snapshot from the response message of each of the plurality of devices. The verification unit is configured to verify, based on the FIB or the FIB snapshot, whether a failure occurs on a network at the specified time.

With reference to the fourth aspect, in a first possible implementation, the request message further carries a period for obtaining the FIB of each of the plurality of devices, and the period indicates each of the plurality of devices to provide the FIB of the device according to the period.

With reference to the fourth aspect, in a second possible implementation, the response message of each device carries a time at which the device generates the FIB.

According to a fifth aspect, this application provides a system for obtaining a FIB of a device. The system includes a plurality of devices and a verification system. The verification system is configured to send a request message to each of the plurality of devices, receive a response message sent by each of the plurality of devices, obtain, from the response message sent by each of the plurality of devices, a FIB or a FIB snapshot generated by each of the plurality of devices at a specified time, and verify, based on the FIB or the FIB snapshot, whether a failure occurs on a network at the specified time. The request message carries a command for obtaining the FIB of each of the plurality of devices at the specified time. The response message carries the FIB or the FIB snapshot generated at the specified time by each of the plurality of devices. Each of the plurality of devices is configured to receive the request message, obtain the FIB or the FIB snapshot generated at the specified time, generate the response message, and send the response message to the verification system.

With reference to the fifth aspect, in a first possible implementation, each of the plurality of devices is configured to obtain the specified time from the request message, and stop, at the specified time, updating the FIB of the each of the plurality of devices that is stored in a storage area. Each device obtains, from the storage area, the FIB corresponding to the device.

With reference to the fifth aspect, in a second possible implementation, each of the plurality of devices is configured to obtain the specified time from the request message, stop, at the specified time, updating the FIB of the device that is stored in a storage area, and obtain the FIB snapshot of the device from the storage area. Alternatively, each of the plurality of devices is configured to obtain the specified time from the request message, and obtain the FIB snapshot of the device that is generated at the specified time.

With reference to the fifth aspect, in a third possible implementation, the request message further carries a period for obtaining the FIB or the FIB snapshot of each of the plurality of devices, and the period indicates each of the plurality of devices to provide the FIB or the FIB snapshot of the device according to the period.

With reference to the fifth aspect, in a fourth possible implementation, the response message of each device carries a time at which the device generates the FIB.

According to a sixth aspect, this application provides a computer-readable storage medium. The computer-readable storage medium stores an instruction, and when the instruction is run on a computer, the computer is enabled to perform the method according to any one of the first aspect or the possible implementations of the first aspect.

According to a seventh aspect, this application provides another computer-readable storage medium. The computer-readable storage medium stores an instruction, and when the instruction is run on a computer, the computer is enabled to perform the method according to any one of the second aspect or the possible implementations of the second aspect.

According to an eighth aspect, this application provides a network device. The network device includes a network interface, a processor, a memory, and a bus for connecting the network interface, the processor, and the memory. The memory is configured to store a program, an instruction, or code. The processor is configured to execute the program, the instruction, or the code in the memory, to implement the method according to any one of the first aspect or the possible implementations of the first aspect.

According to a ninth aspect, this application provides a network device. The network device includes a network interface, a processor, a memory, and a bus for connecting the network interface, the processor, and the memory. The memory is configured to store a program, an instruction, or code. The processor is configured to execute the program, the instruction, or the code in the memory, to implement the method according to any one of the second aspect or the possible implementations of the second aspect.

DETAILED DESCRIPTION OF ILLUSTRATIVE EMBODIMENTS

In the specification, claims, and accompanying drawings of the present application, the terms "first", "second", and so on (if they exist) are intended to distinguish between similar objects but do not necessarily indicate a specific order or sequence. It should be understood that data termed in such a way is interchangeable in proper circumstances, so that the embodiments described herein may be implemented in other orders than the order illustrated or described herein. Moreover, the terms "include", "contain" and any other variants mean to cover a non-exclusive inclusion. For example, a process, method, system, product, or device that includes a list of steps or units is not necessarily limited to those steps or units that are clearly listed, but may include other steps or units that are not clearly listed or that are inherent to such a process, method, system, product, or device.

Figure 1:
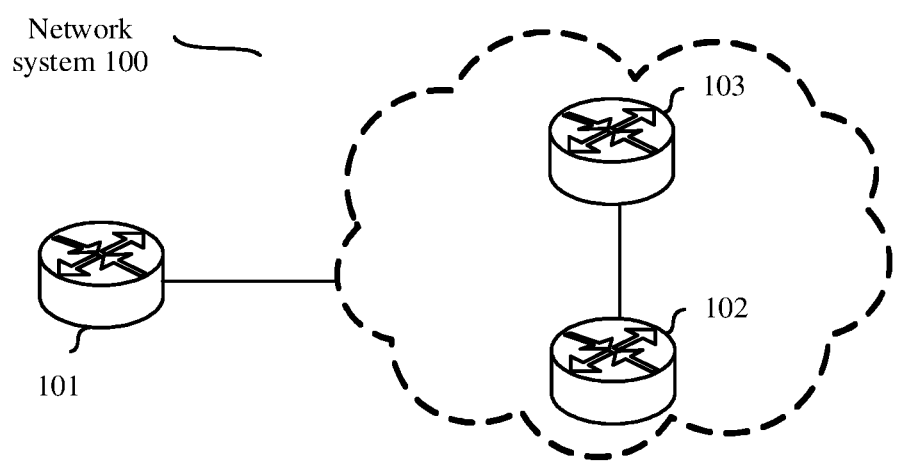
FIG. 1 is a schematic diagram of an application scenario of obtaining a FIB of a device according to an embodiment of the present application.

FIG. 1 is a schematic diagram of an application scenario in which a device generates a FIB. The network system 100 includes: a device 101, the internet, and a device 102 and a device 103 in the internet. As shown in FIG. 1, the devices 101, 102, and 103 may be devices configured to forward a data packet, such as routers or switches. The device 101 is connected to the internet, and the internet includes a large quantity of IP subnets. As shown in FIG. 1, the internet includes the devices 102 and 103, and the devices 102 and 103 are respectively connected to two subnets. For example, the two subnets are 11.1.0.0/16 and 15.2.0.0/16. The device 101 may learn an IP subnet in the internet according to a network protocol, and the device 101 generates a FIB of the device 101 based on a learned IP subnet route, so as to indicate forwarding of a data packet. A router is used as an example. A router 101 may learn routing tables of a router 102 and a router 103 according to a routing protocol, the router 101 generates a FIB on the router 101 based on the learned routing tables, and the router 101 forwards a data packet based on the FIB. However, the internet usually includes 10,000 IP subnets. Therefore, the device 101 needs to learn routes of the 10,000 IP subnets and generate the FIB. It can be learned that the FIB on the device includes a huge quantity of forwarding information bases.

To improve efficiency of network management, verification technologies are widely developed. The verification technology is to verify, based on a verification algorithm, a problem such as reachability or a loop by obtaining FIBs of devices on a network, and modeling the devices on the network or the entire network based on these obtained FIBs according to a data structure or a formula. Therefore, to ensure accuracy and reliability of a verification result, obtaining data required for verification, to be specific, the FIBs of the devices, becomes a key to the verification technology. As shown in Table 1, an experiment result of obtaining a FIB of a device by using the TELNET protocol is provided. The experiment result is used to describe duration of collecting the FIB. As shown in Table 1, duration required for obtaining 10,000 media access control (MAC) address tables is 17.2 seconds. If there are 100,000 virtual machines (VM) in a data center, there are 100,000 entries. It takes about 287 seconds to obtain a MAC address table of the device. A difference between a time for obtaining a first MAC address table and a time for obtaining a last MAC address table is at least 4 minutes. During the 4 minutes, a plurality of changes may occur in a network environment, and a control plane of the device keeps updating and maintaining a routing table. However, because it takes a long time to obtain a forwarding information base, a verification system may not be aware of changes of the obtained forwarding information base. For example, in Table 1, when the verification system obtains the last MAC address table, an obtained first MAC address is unreachable due to a failure. It takes a long time to obtain the MAC address table.

Therefore, the verification system may not be aware of the changes when finishing obtaining FIBs. If these inaccurate FIBs are used for verification and computation, an accurate verification result cannot be obtained. This poses a great challenge to the verification technology and is not conducive to development of the verification technology.

TABLE 1

| Quantity of MAC address entries (entry) | Time for querying a MAC address table (s) |
|---|---|
| 5000 | 8.6 |
| 10000 | 17.2 |
| 15000 | 25.4 |
| 20000 | 34.1 |
| 25000 | 42.5 |
| 30000 | 51.0 |
| 50000 | 96.1 |
| 100000 | 287.0 |

Figure 2:
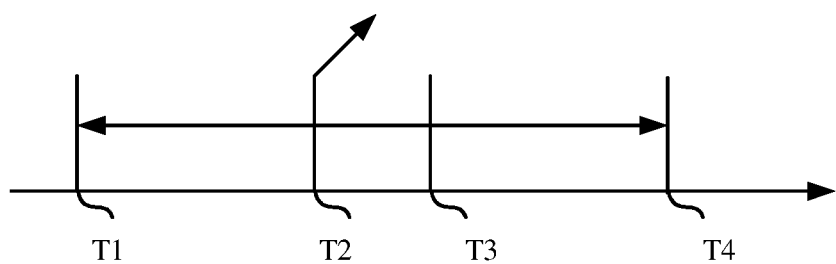
FIG. 2 is a schematic diagram of a time axis of obtaining a FIB of a device according to an embodiment of the present application.

For example, as shown in FIG. 2, an example of a time axis of obtaining FIBs from the device 101 is provided. In FIG. 2, at a time T1, the verification system starts to obtain FIBs from the device 101. To be specific, at the time T1, the verification system obtains a route from the device 101 to the IP subnet 11.1.0.0/16. As mentioned above, because there are a large quantity of FIBs, it takes a long time to obtain the FIBs. Obtaining of the FIBs ends at a time T4. At a time T2, the subnet 11.1.0.0/16 of the internet is interrupted due to a failure. For example, the subnet fails because a link of the subnet is interrupted. In this case, the route from the device 101 to the subnet 11.1.0.0/16 is unreachable. However, because it takes time to notify the interruption to the device 101, the device 101 may not immediately obtain information indicating that the subnet 11.1.0.0/16 is interrupted. In other words, the device 101 may not immediately obtain, at a time T3, information indicating that the route to the subnet 11.1.0.0/16 is interrupted. However, there is still a route to the subnet 11.1.0.0/16 in the FIBs of the device 101. The verification system obtains the route to the subnet 11.1.0.0/16. The verification system takes a long time to obtain FIBs of devices, but the devices learn entries quickly. Therefore, the FIBs of the devices obtained by the verification system may be inconsistent with FIBs learned and updated by the devices. If a route changes, the verification system may not discover the change immediately. However, the verification system still verifies a network based on the obtained FIBs of the devices. As a result, a verification result of the verification system is incorrect.

The network usually includes devices such as a router, a firewall, and a switch. In the verification technology, FIBs of the devices on the network need to be obtained from the devices, and the obtained FIBs of the devices should be generated at a same time, so as to ensure that the obtained FIBs are consistent with data of actual forwarding planes of corresponding devices. However, it can be learned from the foregoing analysis that, a problem in a current manner of obtaining the FIBs: Because it takes a long time to obtain the FIBs from the devices, the FIBs obtained by the verification system are inconsistent with the data of the actual forwarding planes of the devices, so that the FIBs of the devices obtained by the verification system are inaccurate. As a result, the verification result is inaccurate.

To resolve the foregoing technical problem, this application provides a method for obtaining a FIB of a device. In this method, a FIB or a FIB snapshot of each device is obtained at a specified time, so that a verification system can obtain the FIB of the device at the specified time, so as to ensure accuracy of a verification result.

Figure 3:
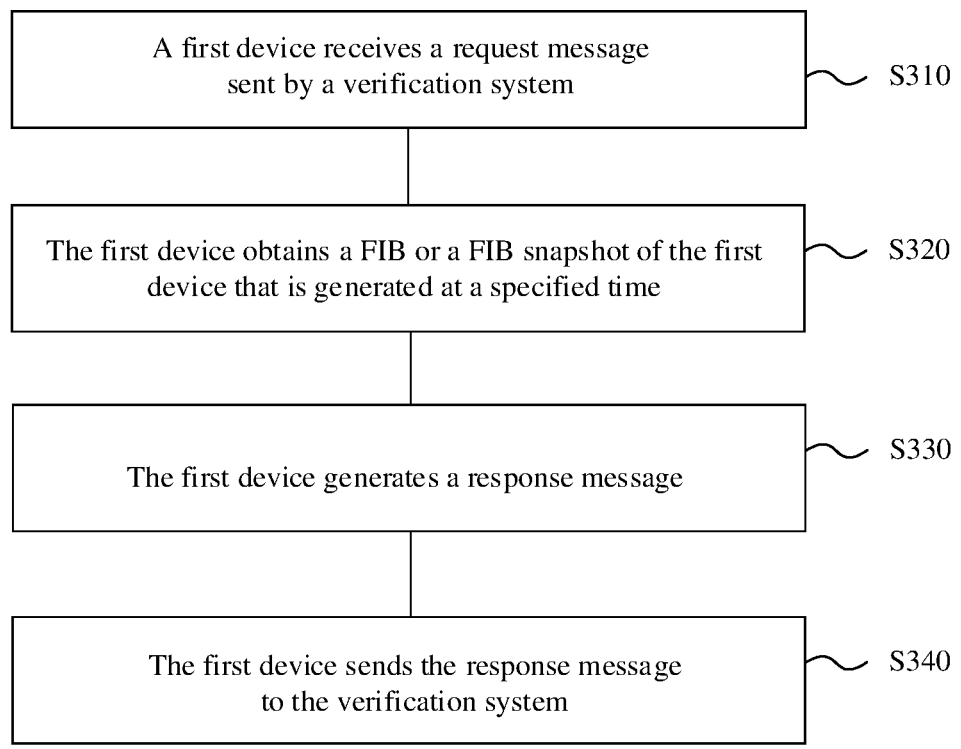
FIG. 3 is a schematic flowchart of a method for obtaining a FIB of a device according to an embodiment of the present application.

FIG. 3 is a schematic flowchart of a method for obtaining a FIB of a device according to this application. The method in FIG. 3 may be used in the scenario in FIG. 1, and a first device in FIG. 3 may be the device 101 in FIG. 1. A network includes a verification system and a plurality of devices, and the first device is one of the plurality of devices. The method includes the following steps.

S310. The first device receives a request message sent by the verification system.

In a possible implementation, the first device may be a router that is capable of forwarding and processing a data packet. The verification system may be software that obtains a verification result through computation based on an obtained FIB and a mathematical model. The software may be run on the first device, or may be run on another network device. A device that runs the verification software or software system may be referred to as a verification device. The verification system sends a command for generating a FIB at a specified time. The command may be sent to the router according to the NETCONF, the TELNET, or the SNMP.

In a possible implementation, no matter which foregoing protocol is used, the protocol includes a command for obtaining a FIB of the first device that is generated at the specified time. The request message may further include a period for obtaining the FIB. The first device may generate the FIB according to the period, and send the generated FIB to the verification system according to the period. For example, the FIB generated by the first device needs to be obtained for a plurality of times, and an interval is required each time. The period for obtaining the FIB of the first device is 30 seconds, and the first device generates the FIB every 30 seconds. The first device may send, to the verification system, the FIB generated according to the period.

In a possible implementation, the request message carries the command for obtaining the FIB of the first device that is generated at the specified time, where the FIB includes related entries used by the first device to indicate forwarding of a data packet. For example, the FIB may include entries such as an internet protocol (IP) forwarding information base, a MAC forwarding information base, and a multiprotocol label switching (MPLS) forwarding information base. The entries are not limited in this application.

S320. The first device obtains the FIB or a FIB snapshot of the first device that is generated at the specified time.

In a possible implementation, the first device obtains the FIB or the FIB snapshot generated at the specified time. For example, the first device is a router. The router may continuously learn a route to maintain a routing table, and generate a FIB based on the routing table. Because the router continuously maintains and updates the routing table, and the FIB is updated with an update of the routing table. Therefore, the FIB of the router changes continuously. After receiving the request message, the router obtains, according to the command, a FIB or a FIB snapshot generated at a specified time.

In a possible implementation, the first device may continuously store FIB snapshots generated at different times. The first device obtains, according to the specified time in the request message, a FIB snapshot corresponding to the specified time from the stored FIB snapshots. The first device may alternatively generate, at the specified time, a FIB snapshot according to the specified time. In this way, the first device not only can obtain a FIB snapshot generated at a time before the request message is sent, but also can obtain a FIB snapshot generated at a specified time after the request message is sent.

In a possible implementation, the first device includes a first storage area, and may further include a second storage area. The second storage area stores, in real time, a FIB learned and updated by the first device. The first storage area may store the FIB learned and updated by the first device, or may obtain, in real time, the FIB of the first device by synchronizing with the second storage area. Both the first storage area and the second storage area may be integrated into a memory or a memory card of the first device. Alternatively, the first storage area runs on a memory card. This is not limited in this application. The first device obtains the specified time from the request message, and stops, according to the specified time, updating the FIB stored in the first storage area. In this way, the FIB stored by the first device at the specified time may be obtained. The first device obtains the FIB stored in the first storage area at the specified time. The first device encapsulates the FIB at the specified time into a response packet, and may continue to obtain an update by synchronizing data with the second storage area according to an instruction.

For example, the first device further includes a storage area specially used to store a FIB. The storage area used to store a FIB may be a part of storage space provided by the memory of the first device, or may be storage space provided by the memory card that is added for the first device. The storage area specially used to store a FIB is used to write the FIB of the first device. The storage area specially used to store a FIB is referred to as a FIB storage area below. The first device may write the generated FIB of the first device into a buffer of the first device and the FIB storage area. Alternatively, the first device may write the FIB of the first device into only the buffer of the first device, and the FIB storage area synchronizes with the buffer of the first device in real time, to ensure that FIBs in both the buffer of the first device and the FIB storage area are the same. The first device receives the request message from the verification system, and obtains the specified time from the request message. The first device stops, at the specified time, writing an updated FIB into the FIB storage area; or the FIB storage area stops, at the specified time, synchronizing the FIB with the buffer of the first device, in other words, updating of the FIB in the FIB storage area is stopped at the specified time. In this way, the first device may obtain, from the FIB storage area, the FIB or the FIB snapshot that is generated at the specified time. According to the foregoing method, the first device can obtain the FIB that is generated at the specified time.

S330. The first device generates a response message.

In a possible implementation, the first device encapsulates the obtained FIB of the first device into the response message, or the first device encapsulates the obtained FIB snapshot of the first device into the response message. If the first device obtains the FIB, the first device encapsulates the FIB into the response message. If the first device obtains the FIB snapshot, the first device encapsulates the FIB snapshot into the response message.

In a possible implementation, the response message may have a same type as the request message. For example, the response message may also be sent to the router according to the NETCONF, the TELNET, or the SNMP.

S340. The first device sends the response message to the verification system.

In a possible implementation, the response message further carries a time for obtaining the FIB of the first device. For example, a time stamp of generating the FIB is encapsulated into the response message.

Because the verification system receives a relatively large quantity of FIBs sent by the devices, and the verification system receives FIBs at different moments with an update of FIBs of the devices. Therefore, times for obtaining the FIBs may be carried in the response message, so that the verification system may classify the obtained FIBs according to the carried times. This facilitates verification and computation.

Through the foregoing steps, the verification system may obtain, according to the foregoing method, FIBs generated at the specified time by the plurality of devices on the network, where content of the FIB is a forwarding information status of the device at a specific time. The verification system verifies, based on the FIB obtained at the specified time and a verification algorithm, a problem such as reachability or a loop at the specified time. In addition, in the foregoing method, the verification system may further obtain the FIBs of the devices that are generated at a same time, so as to ensure accuracy of the verification result.

Figure 4:
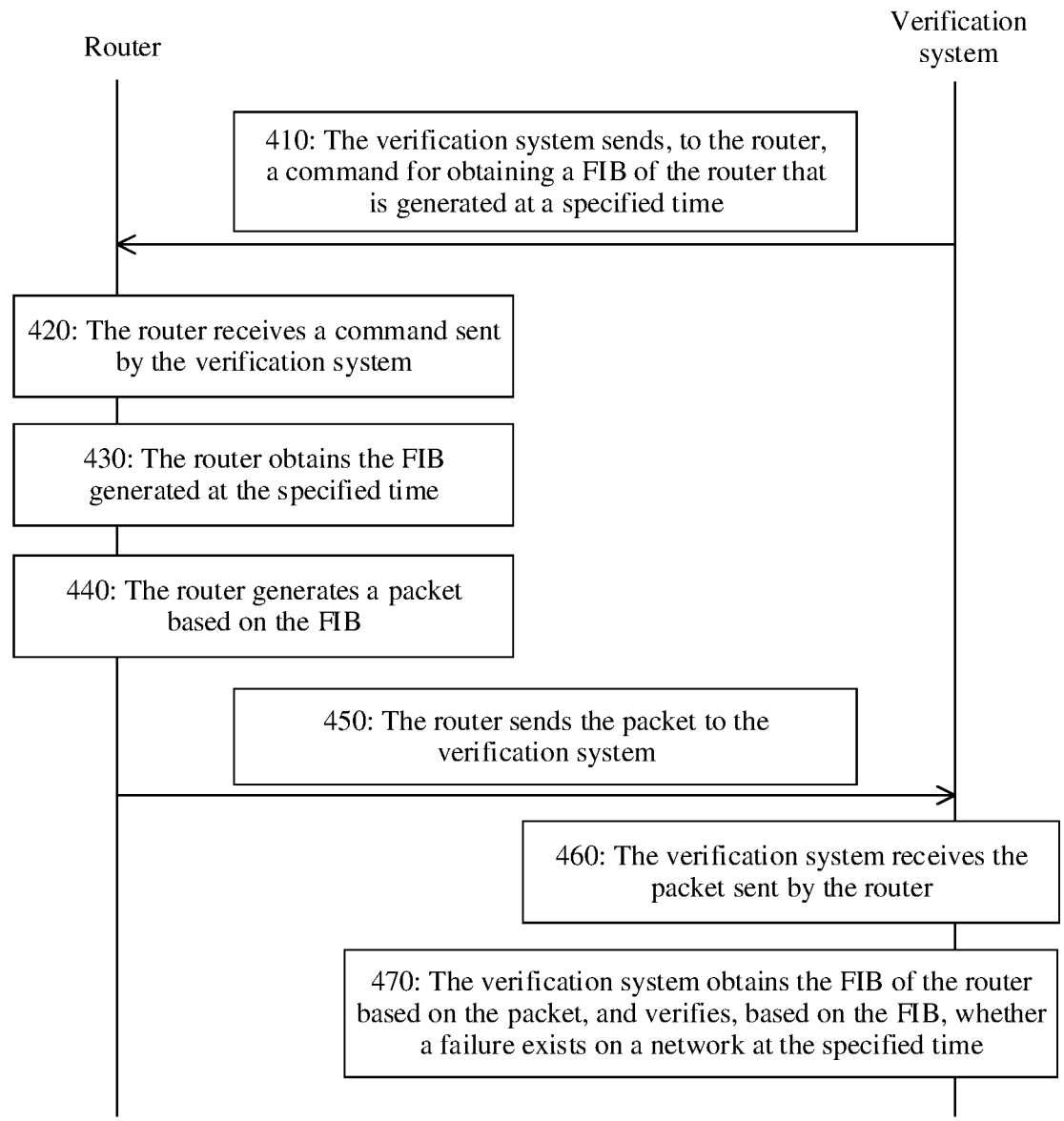
FIG. 4 is a schematic flowchart of another method for obtaining a FIB of a device according to an embodiment of the present application.

FIG. 4 is a schematic flowchart of a method for obtaining a FIB of a device according to this application. A router in the method may be the first device in FIG. 3, and the router has a function of the first device. A verification system may be a second device in FIG. 3, and the verification system has a function of the second device. A scenario in which the method is used may include a plurality of routers and one or more verification systems. In the schematic flowchart of the method shown in FIG. 4, the foregoing method is described by using one of the plurality of routers and one verification system as an example. Each of the plurality of routers in this scenario may have a function of the router in FIG. 4, and may perform method steps that are performed by the router. The method includes the following steps.

S410. The verification system sends, to the router, a command for obtaining a FIB of the router that is generated at a specified time.

For example, the verification system sends a NETCONF packet to the router, where the NETCONF packet carries the command for obtaining the FIB of the router that is generated by the router at the specified time. The verification system may alternatively carry the command through a TELNET packet or an SNMP packet, where the command instructs the router to obtain the FIB of the router that is generated at the specified time. Optionally, the command may include a cyclic period or a start time of obtaining the FIB of the router. For example, a timestamp or a time carried in the command is 2018:02:26:14:00:00. This indicates that a FIB generated by the router at 14:00 on Feb. 26, 2018 is obtained. The command may further carry a period of obtaining the generated FIB, where the period is 900 seconds.

S420. The router receives the command sent by the verification system.

S430. The router obtains the FIB generated at the specified time.

For example, the router may generate, based on the FIB generated at the specified time, a FIB in a storage area of the router through software forwarding, for example, according to the RIP protocol (Routing Information Protocol). The router may generate a FIB snapshot based on the FIB of the storage area. Alternatively, a FIB dual-write technology may be used. To be specific, a FIB is generated in one storage area of the router, and the FIB is synchronously written into another storage area of the router at a same time, and writing an entry into the another storage area is stopped at the specified time in the command. In this way, content of the FIB does not change at the specified time. It is equivalent that a FIB at a specific time is stored, so that the router can obtain the FIB at the specified time from another storage area.

S440. The router generates a packet, where the packet carries the FIB generated by the router at the specified time.

For example, the router may encapsulate the obtained FIB snapshot into the packet and send the packet to the verification system. Alternatively, the router may encapsulate the obtained FIB into the packet and send the packet to the verification system.

For example, the router may encapsulate the obtained FIB of the router into a NETCONF packet, a TELNET packet, or an SNMP packet.

S450. The router sends the packet to the verification system.

S460. The verification system receives the packet sent by the router.

S470. The verification system obtains the FIB of the router based on the packet, and verifies, based on the FIB, whether a failure occurs on a network at the specified time.

For example, the verification system receives a FIB sent by each of the plurality of routers. FIBs of the plurality of devices obtained by the verification system are collected from the devices at a same specified time. The verification system verifies and computes the FIBs at the specified time based on the FIBs collected from the devices at the specified time and based on a mathematical model. In addition, verification analysis is performed to verify whether a failure occurs on the network at the specified time, for example, to verify whether a problem such as a loop or unreachability occurs on the network at the specified time.

According to the foregoing method, the device is enabled to obtain, according to the command, the FIB that is generated at the specified time, and send the FIB to the verification system. In this way, the verification system can obtain FIBs of the devices that are generated at a same time, so as to avoid a problem that a verification result is inaccurate because the FIBs of the devices obtained by the verification system are inaccurate due to a network status or a long time for collecting the FIBs of the devices.

Figure 5:
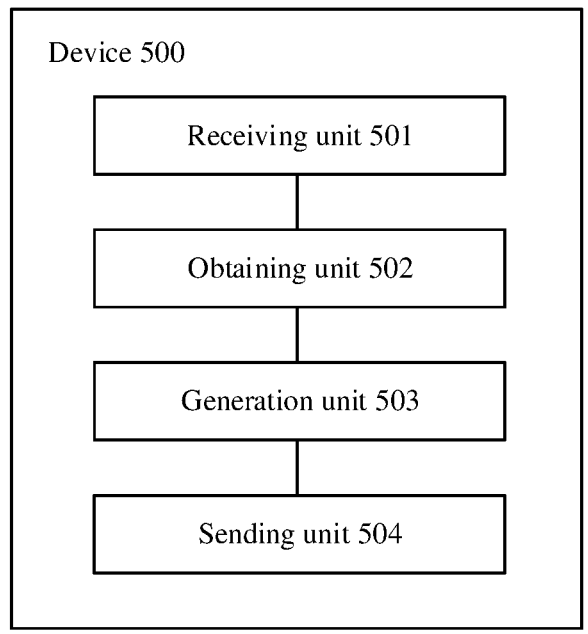
FIG. 5 shows a device according to an embodiment of the present application.

FIG. 5 shows a device for generating a forwarding information base according to this application. The device may be the device 101 in FIG. 1, the device in the schematic flowchart of the method in FIG. 4, or a router in FIG. 5; and may implement functions of the device in FIG. 4 and the router in FIG. 5. The device includes a receiving unit 501, an obtaining unit 502, a generation unit 503, and a sending unit 504. The receiving unit 501 is configured to receive a request message sent by a verification system, where the request message carries a command for obtaining a FIB generated at a specified time. The obtaining unit 502 is configured to obtain the FIB or a FIB snapshot generated at the specified time. The generation unit 503 is configured to generate a response message, where the response message carries the FIB or the FIB snapshot. The sending unit 504 is configured to send the response message to the verification system.

In a possible implementation, the obtaining unit 502 is configured to obtain the specified time from the request message; the generation unit 503 is configured to stop, at the specified time, updating a FIB of a first device that is stored in a storage area; and the obtaining unit 502 is configured to obtain the FIB of the first device from the storage area.

In a possible implementation, the obtaining unit 502 is configured to obtain the specified time from the request message; the generation unit 503 is configured to stop, at the specified time, updating a FIB of a first device that is stored in a storage area; and the obtaining unit 502 is configured to obtain the FIB snapshot of the first device from the storage area. Alternatively, the obtaining unit 502 is configured to obtain the specified time from the request message; and the obtaining unit 502 is configured to obtain the FIB snapshot of the first device that is generated at the specified time.

In a possible implementation, the request message further carries a period for obtaining the FIB of the first device, and the first device provides the FIB of the first device to the verification system according to the period.

In a possible implementation, the device further includes an adding unit. The adding unit is configured to add a time for generating the FIB of the first device to the response message.

In this specific implementation, for specific implementations of the receiving unit 501, the obtaining unit 502, the generation unit 503, and the sending unit 504, refer to functions and implementation steps of the first device in FIG. 3 and the router in FIG. 4. For brevity, details are not described again.

Figure 6:
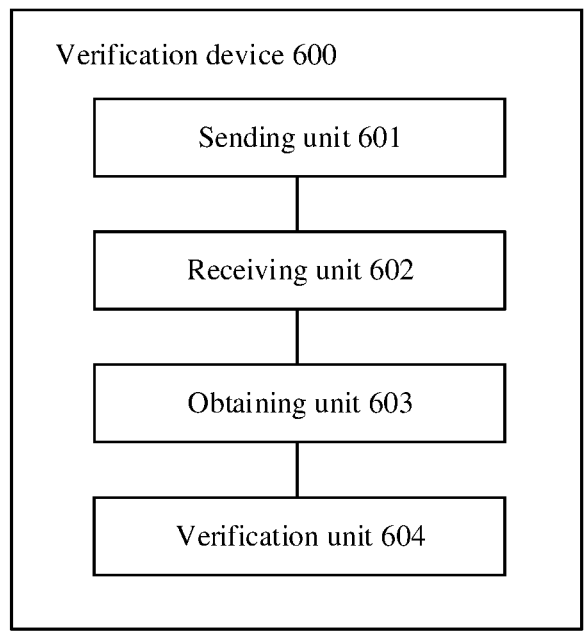
FIG. 6 shows a verification device according to an embodiment of the present application.

FIG. 6 shows a verification device according to this application. The verification device includes a sending unit 601, a receiving unit 602, an obtaining unit 603, and a verification unit 604. The sending unit 601 is configured to send a request message to each of a plurality of devices, where the request message carries a command for obtaining a forwarding information base FIB generated at a specified time by each of the plurality of devices. The receiving unit 602 is configured to receive a response message sent by each of the plurality of devices, where the response message carries the FIB or a FIB snapshot generated at the specified time by each of the plurality of devices. The obtaining unit 603 is configured to obtain the FIB or the FIB snapshot from the response message of each of the plurality of devices. The verification unit 604 is configured to verify, based on the FIB or the FIB snapshot, whether a failure occurs on a network at the specified time.

In a possible implementation, the request message further carries a period for obtaining the FIB of each of the plurality of devices, and the period indicates each of the plurality of devices to provide the FIB of the device according to the period.

In a possible implementation, the response message of each device carries a time at which the device generates the FIB.

In this specific implementation, for specific implementations of the sending unit 601, the receiving unit 602, the obtaining unit 603, and the verification unit 604, refer to functions and implementation steps of the verification systems in FIG. 3 and FIG. 4. For brevity, details are not described again.

Figure 7:
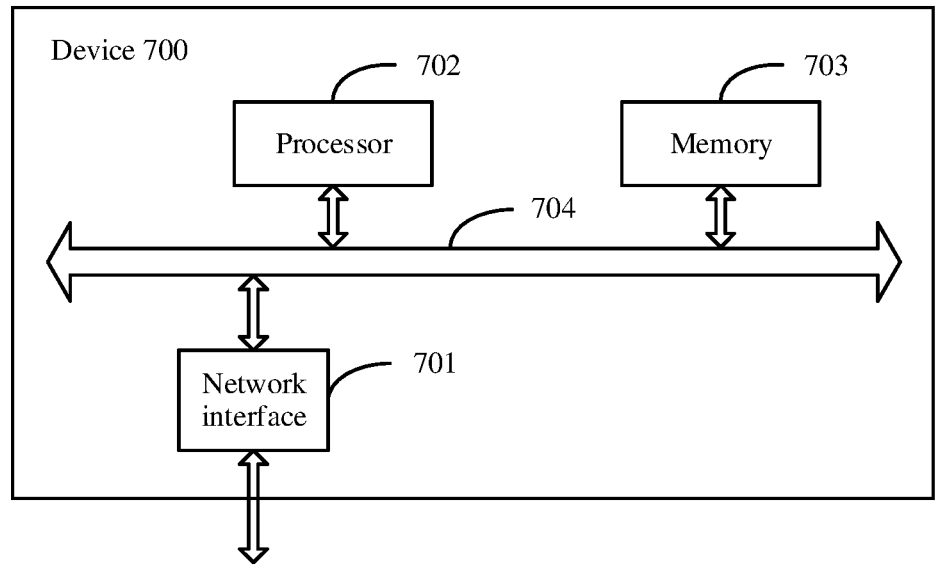
FIG. 7 shows another device according to an embodiment of the present application.

FIG. 7 shows another device according to this application. The device may be the device 101 in FIG. 1, the first device in the schematic flowchart of the method in FIG. 3, or the router in FIG. 4; and may implement functions of the first device and the router. The device includes a network interface 701 and a processor 702, and may further include a memory 703.

The processor 702 includes, but is not limited to, one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof. The processor 702 is responsible for management of a bus 704 and general processing, and may further provide various functions, including timing, a peripheral interface, voltage regulation, power management, and another control function. The memory 703 may be configured to store data used by the processor 702 when the processor 702 performs an operation.

The network interface 701 may be a wired interface, for example, a fiber distributed data interface (FDDI), or an Ethernet interface. The network interface 701 may alternatively be a wireless interface, for example, a wireless local area network interface.

The memory 703 may include, but is not limited to, a content-addressable memory (CAM), for example, a ternary content addressable memory (TCAM) or a random access memory (RAM).

The memory 703 may alternatively be integrated into the processor 702. If the memory 703 and the processor 702 are components independent of each other, the memory 703 is connected to the processor 702. For example, the memory 703 and the processor 702 may communicate with each other through the bus. The network interface 701 and the processor 702 may communicate with each other through the bus, or the network interface 701 may be directly connected to the processor 702.

The bus 704 may include any quantity of interconnected buses and bridges, and the bus 704 connects various circuits including one or more processors represented by the processor 702 and memories represented by the memory 703. The bus 704 may further connect various other circuits such as a peripheral device, a voltage stabilizer, and a power management circuit. These are all well-known in the art, and therefore are not described in further details in this specification.

In a possible implementation, the network interface 701 is configured to receive a request message sent by a verification system and send a response message to the verification system, where the request message carries a command for obtaining a FIB generated at a specified time, and the response message carries the FIB or a FIB snapshot. The processor 702 is configured to obtain the FIB or the FIB snapshot generated at the specified time, and generate the response message.

In a possible implementation, the processor 702 is further configured to obtain the specified time from the request message, stop, at the specified time, updating a FIB of the first device that is stored in a storage area, and obtain the FIB of the first device from the storage area. The memory 703 is configured to store the FIB of the first device, and makes an update based on learning of the first device.

In a possible implementation, the processor 702 is configured to obtain the specified time from the request message, stop, at the specified time, updating a FIB of the first device that is stored in a storage area, and obtain a FIB snapshot of the first device from the storage area. Alternatively, the processor 702 is configured to obtain the specified time from the request message, and obtain a FIB snapshot of the first device that is generated at the specified time.

In a possible implementation, the request message further carries a period for obtaining the FIB of the first device, and the first device provides the FIB of the first device to the verification system according to the period.

In a possible implementation, the processor 702 is further configured to add a time for generating the FIB of the first device to the response message.

In this specific implementation, for specific implementations of the processor 702, the network interface 701, and the memory 703, refer to functions and implementation steps of the first device in FIG. 3 and the router in FIG. 4. For brevity, details are not described again.

Figure 8:
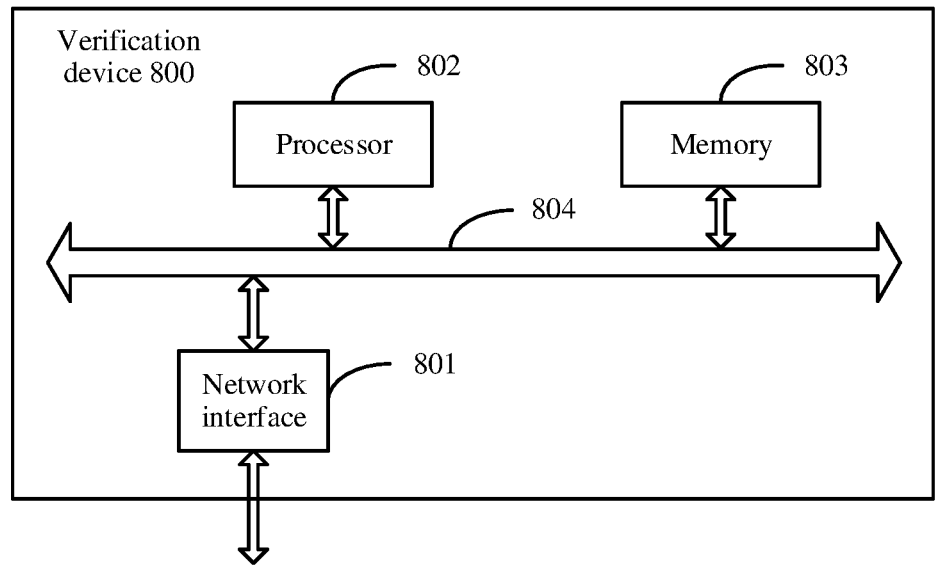
FIG. 8 shows another verification device according to an embodiment of the present application.

FIG. 8 shows another verification device according to this application. The device includes a network interface 801 and a processor 802, and may further include a memory 803.

The processor 802 includes, but is not limited to, one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof. The processor 802 is responsible for management of a bus 804 and general processing, and may further provide various functions, including timing, a peripheral interface, voltage regulation, power management, and another control function. The memory 803 may be configured to store data used by the processor 802 when the processor 802 performs an operation.

The network interface 801 may be a wired interface, for example, a fiber distributed data interface (FDDI), or an Ethernet interface. The network interface 801 may alternatively be a wireless interface, for example, a wireless local area network interface.

The memory 803 may include, but is not limited to, a content-addressable memory (CAM), for example, a ternary content addressable memory (TCAM) or a random access memory (RAM).

The memory 803 may alternatively be integrated into the processor 802. If the memory 803 and the processor 802 are components independent of each other, the memory 803 is connected to the processor 802. For example, the memory 803 and the processor 802 may communicate with each other through the bus. The network interface 801 and the processor 802 may communicate with each other through the bus, or the network interface 801 may be directly connected to the processor 802.

The bus 804 may include any quantity of interconnected buses and bridges, and the bus 804 connects various circuits including one or more processors represented by the processor 802 and memories represented by the memory 803. The bus 804 may further connect various other circuits such as a peripheral device, a voltage stabilizer, and a power management circuit. These are all well-known in the art, and therefore are not described in further details in this specification.

In a possible implementation, the network interface 801 is configured to send a request message to each of a plurality of devices, and receive a response message sent by each of the plurality of devices. The request message carries a command for obtaining a forwarding information base FIB generated at a specified time by each of the plurality of devices, and the response message carries the FIB or a FIB snapshot generated at the specified time by each of the plurality of devices. The processor 802 is configured to obtain the FIB or the FIB snapshot from the response message of each of the plurality of devices, and verify, based on the FIB or the FIB snapshot, whether a failure occurs on a network at the specified time.

In a possible implementation, the request message further carries a period for obtaining the FIB of each of the plurality of devices, and the period indicates each of the plurality of devices to provide the FIB of the device according to the period.

In a possible implementation, the response message of each device carries a time at which the device generates the FIB.

In this specific implementation, for specific implementations of the processor 802 and the network interface 801, refer to functions and implementation steps of the verification systems in FIG. 3 and FIG. 4. For brevity, details are not described again.

Figure 9:
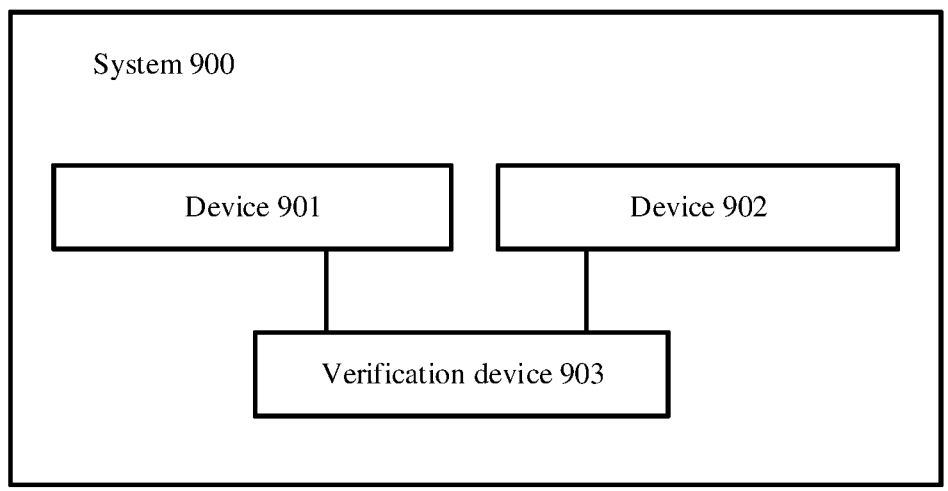
FIG. 9 shows a system for obtaining a FIB of a device according to an embodiment of the present application.

FIG. 9 shows a system for obtaining a FIB of a device according to this application. The system includes a plurality of devices 901 and 902, and a verification device 903. The verification device 903 sends a request message to each of the device 901 and the device 902, receives a response message sent by each of the device 901 and the device 902, obtains, from the response message of each of the device 901 and the device 902, a forwarding information base FIB or a FIB snapshot generated by each of the devices at a specified time, and verifies, based on the FIB or the FIB snapshot, whether a failure occurs on a network at the specified time. The request message carries a command for obtaining the FIB of each of the plurality of devices at the specified time. The response message carries the FIB or the FIB snapshot generated at the specified time by each of the plurality of devices. The device 901 and the device 902 are configured to receive the request message, obtain the FIB or the FIB snapshot generated at the specified time, generate the response message, and send the response message to the verification system.

In a possible implementation, the device 901 is configured to obtain the specified time from the request message, and stop, at the specified time, updating a FIB of the device 901 that is stored in a storage area. The device 901 obtains, from the storage area, the FIB of the device 901.

In a possible implementation, the device 901 is configured to obtain the specified time from the request message, stop, at the specified time, updating the FIB of the device 901 that is stored in a storage area, and obtain the FIB snapshot of the device 901 from the storage area. Alternatively, the device 901 is configured to obtain the specified time from the request message, and obtain the FIB snapshot of the device 901 that is generated at the specified time.

In a possible implementation, the request message further carries a period for obtaining the FIB of the device 901 in the plurality of devices, and the period indicates the device 901 in the plurality of devices to provide the FIB of the device 901 according to the period.

In a possible implementation, the response message of each device carries a time at which the device 901 generates the FIB.

Because the device 901 and the device 902 have a same function and perform a same step in a system, the step performed by the device 901 in the foregoing implementations may be performed by the device 902. Therefore, the foregoing function of the device 902 is not described again.

The device 901 and the device 902 each may be the first device in the schematic flowchart of the method in FIG. 3 or the router in FIG. 4; and may implement functions of the first device and the router. Alternatively, the device 901 and the device 902 each may be the device in FIG. 5 or FIG. 7.

The verification device 903 may be the verification system in the schematic flowchart of the method in FIG. 3 or the verification device in the schematic flowchart of the method in FIG. 4; and may implement functions of the verification device or the verification system. Alternatively, the verification device 903 may be a first PE device in FIG. 6 or FIG. 8. The verification device 903 may alternatively be the verification device in FIG. 6 or FIG. 8.

In this specific implementation, for specific implementations of the devices 901 and 902, refer to functions and implementation steps of the first device in FIG. 3 or the router in FIG. 4. For a specific implementation of the verification device 903, refer to functions and implementation steps of the verification systems in FIG. 3 and FIG. 4. For brevity, details are not described again.

It should be understood that sequence numbers of the foregoing methods do not mean execution sequences in various embodiments of this application. The execution sequences of the methods should be determined according to functions and internal logic of the methods, and should not be construed as any limitation on the implementation processes of the embodiments of this application.

In the several embodiments provided in this application, it should be understood that the disclosed methods and devices may be implemented in other manners. For example, the described apparatus embodiment is merely an example. For example, division into modules is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The modules described as separate parts may or may not be physically separate, and parts displayed as modules may or may not be physical units, may be located in one position, or may be distributed on a plurality of network units. Some or all of the units may be selected based on actual requirements to achieve the objectives of the solutions of the embodiments.

In addition, functional modules in the embodiments of the present application may be integrated into one processing unit, or each of the modules may exist alone physically, or two or more modules are integrated into one module. The integrated module may be implemented in a form of hardware, or may be implemented in a form of hardware in addition to a software functional unit.

When the integrated unit is implemented in the form of hardware combined with software and sold or used as an independent product, the software may be stored in a computer-readable storage medium. Based on such an understanding, in the technical solutions of the present application, some technical features contributing to the prior art may be implemented in a form of a software product. The computer software product is stored in a storage medium, and includes some instructions for instructing a computer device (which may be a personal computer, a server, a network device, or the like) to perform all or some of the steps of the methods described in the embodiments of the present application. The storage medium may be a USB flash drive, a removable hard disk, a read-only memory (ROM), a random access memory (RAM), a magnetic disk, or an optical disc. The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
receiving, by a forwarding device, a first message sent by
   a verification system, wherein the first message instructs to obtain forwarding information base (FIB) information generated at a first time;

obtaining, by the forwarding device, the FIB information based on the first message;

generating, by the forwarding device, a second message, wherein the second message carries the FIB information; and sending, by the forwarding device, the second message to the verification system.

2. The method according to claim 1, wherein the FIB information is an entry comprised in a FIB, and obtaining, by the forwarding device, the FIB information based on the first message comprises:

obtaining, by the forwarding device, the first time based on the first message;

stopping, by the forwarding device at the first time, updating the entry comprised in the FIB, wherein the FIB is stored in a storage area; and obtaining, by the forwarding device, the entry comprised in the FIB from the storage area.

3. The method according to claim 1, wherein the FIB information is an FIB snapshot, and obtaining, by the forwarding device, the FIB information based on the first message comprises:

obtaining, by the forwarding device, the first time based on the first message;

stopping, by the forwarding device at the first time, updating a FIB that is stored in a storage area; and obtaining, by the forwarding device, the FIB snapshot based on the FIB from the storage area.

4. The method according to claim 1, wherein the FIB information is an FIB snapshot, and obtaining, by the forwarding device, the FIB information based on the first message comprises:

obtaining, by the forwarding device, the first time based on the first message; and obtaining, by the forwarding device, the FIB snapshot generated at the first time.

5. The method according to claim 1, wherein the first message instructs a period for obtaining the FIB information, and the method further comprises:

sending, by the forwarding device, the FIB information to the verification system periodically based on the first message.

6. The method according to claim 5, wherein the first message comprises the period.

7. The method according to claim 1, wherein the second message comprises a time for generating the FIB information.

8. The method according to claim 1, wherein the first message comprises the first time.

9. A forwarding device, comprising:
a memory storing instructions; and
a processor coupled to the memory to execute the instructions, the instructions including instructions to:
receive a first message sent by a verification system, wherein the first message instructs to obtain forwarding information base (FIB) information generated at a first time;
obtain the FIB information based on the first message;
generate a second message, wherein the second message carries the FIB information; and
send the second message to the verification system.

10. The forwarding device according to claim 9, wherein the FIB information is an entry comprised in a FIB, and the instructions further include instructions to:
obtain the first time based on the first message;
stop, at the first time, updating the entry comprised in the FIB, wherein the FIB is stored in a storage area; and
obtain the entry comprised in the FIB from the storage area.

11. The forwarding device according to claim 9, wherein the FIB information is an FIB snapshot, and the instructions further include instructions to:
obtain the first time based on the first message;
stop updating a FIB that is stored in a storage area; and
obtain the FIB snapshot based on the FIB from the storage area.

12. The forwarding device according to claim 9, wherein the FIB information is an FIB snapshot, and the instructions include instructions to:
obtain the first time from the first message; and
obtain the FIB snapshot generated at the first time.

13. The forwarding device according to claim 9, wherein the first message instructs a period for obtaining the FIB information, and the instructions include instructions to:
send the FIB information to the verification system periodically based on the first message.

14. The forwarding device according to claim 13, wherein the first message comprises the period.

15. The forwarding device according to claim 9, wherein the second message comprises a time for generating the FIB information.

16. The forwarding device according to claim 9, wherein the first message comprises the first time.

17. A system, comprising:
a verification system; and
a forwarding device, configured to:
receive a first message sent by the verification system, wherein the first message instructs to obtain forwarding information base (FIB) information generated at a first time;
obtain the FIB information based on the first message;
generate a second message, wherein the second message carries the FIB information; and
send the second message to the verification system; and
wherein the verification system is configured to:
send the first message; and
receive the second message.

18. The system according to claim 17, wherein the FIB information is an entry comprised in a FIB, and the forwarding device is further configured to:
obtain the first time based on the first message;
stop, at the first time, updating the entry comprised in the FIB, wherein the FIB is stored in a storage area; and
obtain the entry comprised in the FIB from the storage area.

19. The system according to claim 17, wherein the FIB information is an FIB snapshot, and the forwarding device is further configured to:
obtain the first time based on the first message;
stop updating a FIB that is stored in a storage area; and
obtain the FIB snapshot based on the FIB from the storage area.

20. The system according to claim 17, wherein the FIB information is an FIB snapshot, and the forwarding device is further configured to:
obtain the first time from the first message; and
obtain the FIB snapshot generated at the first time.

* * * * *